Dec. 9, 1958   A. LATHAM, JR   2,863,584
EVACUATING A MASS OF POWDERY INSULATION
Filed July 5, 1955   2 Sheets-Sheet 1

INVENTOR.
ALLEN LATHAM, JR.
BY
AGENT

Dec. 9, 1958 A. LATHAM, JR 2,863,584
EVACUATING A MASS OF POWDERY INSULATION
Filed July 5, 1955 2 Sheets-Sheet 2
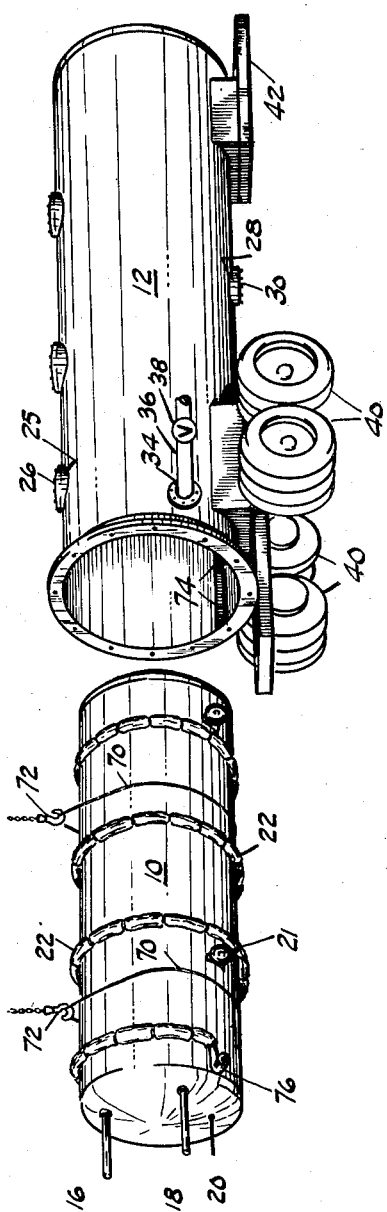
INVENTOR.
ALLEN LATHAM, JR.
BY
AGENT

2,863,584

EVACUATING A MASS OF POWDERY INSULATION

Allen Latham, Jr., Jamaica Plain, Mass., assignor to Arthur D. Little, Inc., Cambridge, Mass., a corporation of Massachusetts Application July 5, 1955, Serial No. 519,935

5 Claims. (Cl. 220—9)

This invention relates to means for evacuating a mass of finely divided insulation material.

With the increased use of liquefied gases such as liquid oxygen and liquid nitrogen, the problems of storing and handling them have been given considerable attention, in an effort to cut down evaporation losses. One of the most effective ways of storing or transporting such liquefied gases, with a minimum of evaporation loss, is to provide a double-walled container in which the space between the walls is filled with insulating material and also evacuated. This removal of air or gas from between the walls minimizes heat transfer by conduction and convection, and the insulating material minimizes the heat transfer by radiation.

Insulating material which is especially satisfactory for this purpose is in finely divided form, such as silica aerogel, diatomaceous silica, fine asbestos or glass fibers, or other known insulating materials in what can generically be referred to as being in "powdery" form.

It would appear to be a simple enough matter to fill the space between the double walls of the container with the powdery insulation, and then draw a vacuum on the space to remove the air. This, however, is not the case when very low pressures (of say one millimeter of mercury absolute, or less) are required. The air, which is more or less entrapped between the particles of insulation material, channels through and carries along the powder toward the vacuum pump; in fact there is a tendency to blow out a considerable amount of the powder into the vacuum line. Placing a filter in the inlet of the vacuum line does not solve the problem, as the powder soon packs against the filter and blocks further evacuation. There is also a more important but less obvious factor involved. At these very low pressures it is practically impossible to develop a substantial differential in pressure because the operation is so close to zero pressure. Thus, as the desired zero pressure is approached there is less and less driving force available to promote flow of the remaining air around the particles of insulation which act as an impediment to flow. For instance, I have observed a pressure differential of nearly 1 mm. across a bed of powdery insulating material less than 3 feet in total dimension, after pumping on it for many hours and holding a pressure of approximately 1 mm. at the pump connection.

Various ways of solving these difficulties have been suggested, such as very slow pumping, but all are either cumbersome, time-consuming, or expensive.

This invention has for its principal object the provision of simple and inexpensive means for rapidly and effectively evacuating a mass of powdery insulation, particularly that used in double-walled or multiple-walled containers for liquid oxygen, liquid nitrogen, and other liquefied gases, wherein the pressure between the double or multiple walls must be reduced to a very low figure, such as 1 mm. of mercury absolute or less. Other objects will appear in the description which follows.

Briefly stated, this invention is carried out by providing, within the space between the double walls, a length or several lengths of non-collapsible porous tubing or conduit, attached to a vacuum line adapted to be connected with a vacuum pump outside the container. This tubing or conduit may be in a single length, or in a series of lengths manifolded together at one or both ends, and is disposed in any suitable configuration to reach, as uniformly as reasonably possible, the entire space within the double walls which is to be filled with the powder and evacuated. The distribution of this tubing throughout the mass of powdery insulation should be as uniform as is reasonably possible, to obtain optimum results. Practical operation of this invention has demonstrated that substantially all places within the mass of insulation should be within approximately two feet from the nearest surface of the porous tubing, for effective evacuation of the entire vacuum space to pressures within a practical range, i. e. approximately 0.1 to 1 mm. absolute.

This invention will now be described in more detail in connection with the accompanying drawings, which are to be considered as illustrative rather than limiting, and in which:

Fig. 4 represents an "exploded" perspective elevation showing inner and outer containers generally similar to those of Figs. 1 and 2 but with a different configuration of the tubing.

Figure 1:
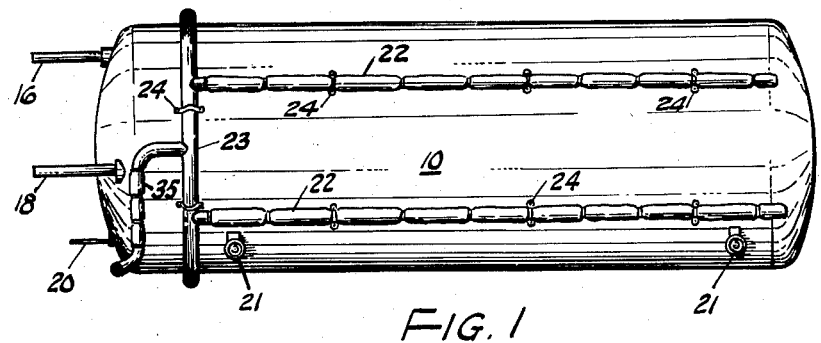
Fig. 1 represents a side elevation of a cylindrical inner shell or container with the tubing in place against its surface.

The arrangement shown in Figs. 1 and 2 will first be described. Shown there are inner container 10, and outer container 12 spaced therefrom on all sides and ends by space 14. Container 10 is provided with the usual necessary inlet and outlet connections 16, 18 and 20 for supplying and removing its contents, and with wheels 21 whereby it may be rolled into position within container 12 as described hereinafter with respect to Fig. 4. Within space 14 are several lengths of the tubing 22 of this invention. Two of these are shown in Fig. 1, and there are two similarly located on the other side of container 10. These four lengths of tubing 22 communicate with header 23, and may be positioned within space 14 by any convenient means, such as by attachment to the outer wall of container 10 by brackets 24, or by attachment similarly to the inner wall of container 12, or otherwise as desired. Container 10 is supported within container 12 by any suitable means, of which many are known, and which need not be shown or described here as they do not form a part of the present invention. Container 12 is provided with a suitable number of manholes 25 through which the insulating material 27 may be poured into the space 14. These manholes are provided with covers 26 which can be tightly fastened down to prevent air leakage. Similarly, manhole 28 and sealable cover 30 are positioned at the bottom of the container 12 to permit ready removal of the insulation and for any desired other purposes such as cleaning. One end of container 12 consists of a head 32 through which connections 16, 18 and 20 project. This head 32 is sealed gas-tight with respect to the end of container 12 and also with respect to connections 16, 18, and 20. Container 12 is also provided with an opening 34 which communicates at its inner end via non-collapsible conduit 35 and non-collapsible header 23 with tubing 22, and at its outer end via pipe 36 controlled by valve means 38 it can be attached to suitable pump means for the purpose of evacuating space 14, in a manner hereinafter described. Conduit 35 may be constructed the same as tubing 22, or may be merely any impervious conduit. By closing valve means 38, communication between the inside of chamber 12 and the outside of the chamber through opening 34 can be effectively cut off after evacuation of space 14 is effected. Accordingly, container 12 is so constructed that space 14 can be evacuated, and maintained, against any significant entrance of air from the outside. There is also no leakage of the contents of container 10 into space 14.

Figure 2:
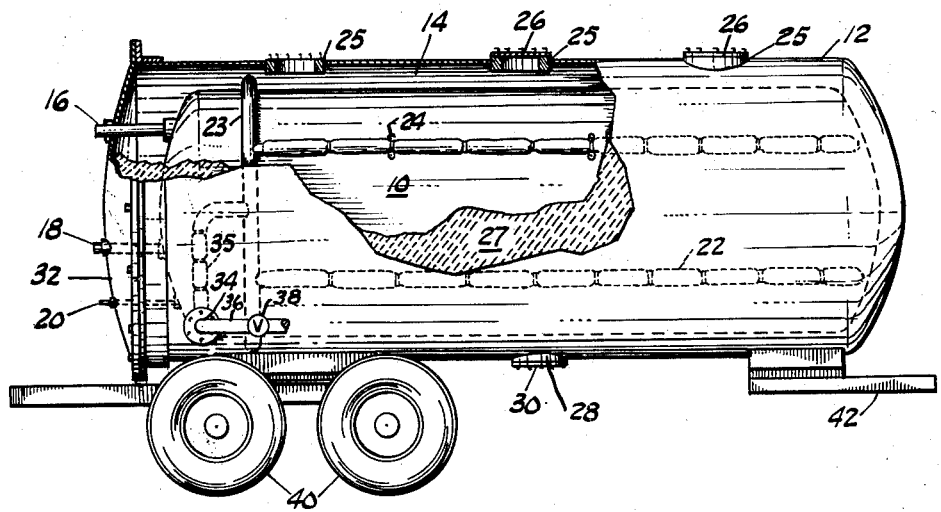
Fig. 2 represents a side elevation, partly in section, showing the container and tubing of Fig. 1 mounted within an outer shell or container, the latter being partly broken away.

The assembly thus described can be in fixed location, or can be mounted for transportation, e. g. over the highways as shown in Fig. 2. To this latter end, there are provided wheels 40 and hitch 42 for attaching to a truck or other motive power.

Figure 3:
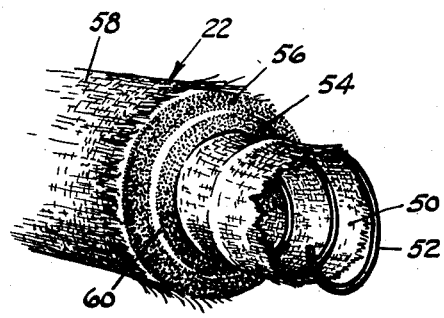
Fig. 3 represents a view of the tubing of this invention, broken away to show its internal construction.

Tubing 22 (Fig. 3) is made up of an inner gas-pervious tube 50, of textile fabric or other suitable medium, supported against collapse throughout its length by helically-wound spring wire 52. Tube 50 is surrounded throughout its length and circumference with one or more layers 54, 56 consisting of a mat of pervious fibrous material such as glass fibers, mineral wool, or natural or synthetic organic fibers. The entire outer surface of these layers is covered by gas-pervious wrapping 58, which may be a textile fabric or other suitable material. If more than one such layer is used (e. g. two layers 54, 56 as shown), a wrapping 60, similar to wrapping 58, may be provided over each such layer.

The arrangement shown in Fig. 4 is the same as that in Figs. 1 and 2, except for the arrangement of the tubing of this invention. The numerals of Figs. 1 and 2 are therefore applied to Fig. 4 to denote like parts, so that an understanding of Fig. 4 may be had by reference to the description of Figs. 1 and 2 and the remarks which follow below.

Container 10 (Fig. 4) is inserted into container 12 by being lifted and carried into position by circumferential cables 70 engaged by hooks 72 supported from above by any appropriate means. Container 10 is then moved toward container 12 until wheels 21 engage tracks 74, upon which container 10 is then rolled into position within container 12. Container 10 is fixed in final position within container 12 by suitable means as mentioned above.

In the arrangement shown in Fig. 4, the tubing 22 is wound helically about cylinder 10, as a single length. One end terminates in a conduit 76, which after assembly of the containers is attached to opening 34. After the openings in container 12 are sealed gas-tight, the space between the containers can then be evacuated by means of a vacuum pump attached to pipe 36, as already referred to in connection with Figs. 1 and 2.

After the container 10 has been suitably located within container 12, and with cover 30 and head 32 fastened in gas-tight relation to manhole 28 and container 12 respectively, the powdery insulating material is poured into space 14 through manholes 25, the covers 26 of which are removed for the purpose. A vacuum pump is connected to pipe 36, valve means 38 being open, and is put into operation for the purpose of assisting in removal of air as the space 14 is being filled. After space 14 is filled, it is preferable to promote settling of the powdery insulating material by shaking the assembly, e. g. by running it over the road. Then additional powdery insulating material is added if necessary to fill space 14 completely, after which manhole covers 26 are attached in gas-tight relation on manholes 25 and a vacuum is pulled through opening 34 and pipe 36. The final pressure within space 14 should, for best results, be as low as is practically possible, preferably below 1 mm. and even as low as a few microns of mercury absolute. A pressure of about 0.1 mm. of mercury absolute is very satisfactory for commercial equipment. When this desired pressure is attained, opening 34 is sealed, as by closing valve means 38.

The tubing of this invention provides a large filtering area, both because of its considerable length in proportion to the surface involved and also because of the large diameter of the tubing with respect to the inner tube 50. Layers 54, 56 are so constructed as to be substantially impervious to the passage of the insulating material, while passing air easily enough for the purposes of this invention. Hence no more than an insignificant amount of the insulating material passes into the vacuum line and out through pipe 36, and yet enough filtering area is provided by tubing 22 to permit the prompt and easy establishment of the desired very low pressure in space 14.

I claim:

1. A device for holding a body of liquefied gas comprising an inner container for said liquefied gas, an outer container surrounding said inner container and spaced therefrom to provide an evacuatable insulation space completely surrounding said inner container, finely-divided heat-insulating material substantially filling said space, elongated tubing extending in said space, the walls of said tubing being non-collapsible under the pressure conditions imposed thereon and pervious to gas and substantially impervious to the passage of said insulating material, passage means communicating between said tubing and the outside of said outer container and being adapted to be connected to a source of high vacuum whereby said space may be evacuated to an absolute pressure of less than about one millimeter of mercury by passing the air from said space through the pervious walls of said tubing and thence along and within said tubing to said passage means, and means for sealing said outer container against the passage of gas between said space and the outside, said tubing being so distributed throughout said space that no point within said space is more than approximately two feet distant from at least one point on said tubing.

2. A device for holding a body of liquefied gas comprising an elongated inner container for said liquefied gas, an elongated outer container surrounding said inner container and spaced therefrom to provide an evacuatable insulation space completely surrounding said inner container, finely divided heat-insulating material filling said space, a plurality of lengths of tubing arranged within said space throughout substantially the entire length thereof and substantially parallel to the long axis of said containers, the walls of said tubing being non-collapsible and pervious to gas and substantially impervious to the passage of said insulating material, conduit means communicating with each of the lengths of said tubing and with the outside of said outer container and being adapted to be connected to a source of high vacuum whereby said space may be evacuated by passing the air from said space through the pervious walls of said tubing and thence along and within said tubing to said conduit means, and means for sealing said outer container against the passage of gas between said space and the outside.

3. A device in accordance with claim 2 wherein said tubing is so distributed throughout said space that no point within said space is more than about two feet distant from at least one point on said tubing.

4. A device for holding a body of liquefied gas comprising an elongated cylindrical inner container for said liquefied gas, an elongated cylindrical outer container surrounding said inner container and spaced therefrom to provide an evacuatable insulation space completely surrounding said inner container, finely-divided heat-insulating material filling said space, a length of tubing helically wound around said inner container, one end of said tubing communicating with the outside of said outer container, the walls of said tubing being supported by helically-wound spring wire against collapse under the pressure conditions imposed, and pervious to gas and substantially impervious to the passage of said insulating material, and means for sealing said outer container against the passage of gas between said space and the outside.

5. A device in accordance with claim 4 wherein said tubing is so distributed throughout said space that no point within said space is more than about two feet distant from at least one point on said tubing.

References Cited in the file of this patent

UNITED STATES PATENTS

| | | |
|---|---|---|
| 139,126 | Dunwiddie | May 20, 1873 |
| 1,835,699 | Edmonds | Dec. 8, 1931 |
| 2,000,882 | Comstock | May 7, 1935 |
| 2,186,440 | Williams | Jan. 9, 1940 |
| 2,381,796 | Williams | Aug. 7, 1945 |
| 2,396,459 | Dana | Mar. 12, 1946 |
| 2,513,749 | Schilling | July 4, 1950 |
| 2,677,938 | Loveday | May 11, 1954 |